(12) United States Patent
Takizawa et al.

(10) Patent No.: US 12,237,726 B2
(45) Date of Patent: Feb. 25, 2025

(54) ROTOR, METHOD OF PRODUCING THE ROTOR, AND MOTOR

(71) Applicant: SHINANO KENSHI KABUSHIKI KAISHA, Nagano (JP)

(72) Inventors: Keisuke Takizawa, Nagano (JP); Hisao Hirabayashi, Nagano (JP); Masakazu Ikeda, Nagano (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 249 days.

(21) Appl. No.: 17/802,831

(22) PCT Filed: Jan. 22, 2021

(86) PCT No.: PCT/JP2021/002134
§ 371 (c)(1),
(2) Date: Aug. 26, 2022

(87) PCT Pub. No.: WO2021/205707
PCT Pub. Date: Oct. 14, 2021

(65) Prior Publication Data
US 2023/0108154 A1    Apr. 6, 2023

(30) Foreign Application Priority Data

Apr. 7, 2020 (JP) ................ 2020-069097

(51) Int. Cl.
*H02K 1/28* (2006.01)
*H02K 1/278* (2022.01)
(Continued)

(52) U.S. Cl.
CPC ............. *H02K 1/28* (2013.01); *H02K 1/278* (2013.01); *H02K 1/2791* (2022.01); *H02K 15/03* (2013.01)

(58) Field of Classification Search
CPC ........ H02K 1/28; H02K 1/278; H02K 1/2791; H02K 15/03
See application file for complete search history.

(56) References Cited

U.S. PATENT DOCUMENTS

2003/0193254 A1    10/2003  Morimatsu
2015/0244217 A1     8/2015  Shimamori

FOREIGN PATENT DOCUMENTS

DE   102006049866   4/2008
JP       61-46151   3/1986
(Continued)

OTHER PUBLICATIONS

International Search Report dated Mar. 31, 2021 in International Patent Application No. PCT/JP2021/002134.

*Primary Examiner* — Tulsidas C Patel
*Assistant Examiner* — Mohammed Ahmed Qureshi
(74) *Attorney, Agent, or Firm* — Stephen J. Weyer, Esq.; Stites & Harbison, PLLC

(57) ABSTRACT

A plurality of plate-like magnets are positioned in a radial direction and an axial direction and are arranged at a predetermined interval to an inner circumferential surface of a rotor yoke, and a first adhesive is cured, thus forming each partition part that partitions the plate-like magnets from each other and partially bonding the plate-like magnets at a first bonding part, and a second adhesive is cured, thus bonding and fixing the plate-like magnets at a second bonding part while the plurality of plate-like magnets are partitioned from each other at a predetermined interval in a circumferential direction by the partition part.

9 Claims, 8 Drawing Sheets

(51) Int. Cl.
*H02K 1/2791* (2022.01)
*H02K 15/03* (2006.01)

(56) References Cited

FOREIGN PATENT DOCUMENTS

| | | |
|---|---|---|
| JP | 2003304660 | 10/2003 |
| JP | 2008-236895 | 10/2008 |
| JP | 2013-183537 | 9/2013 |
| JP | 2015-159639 | 9/2015 |

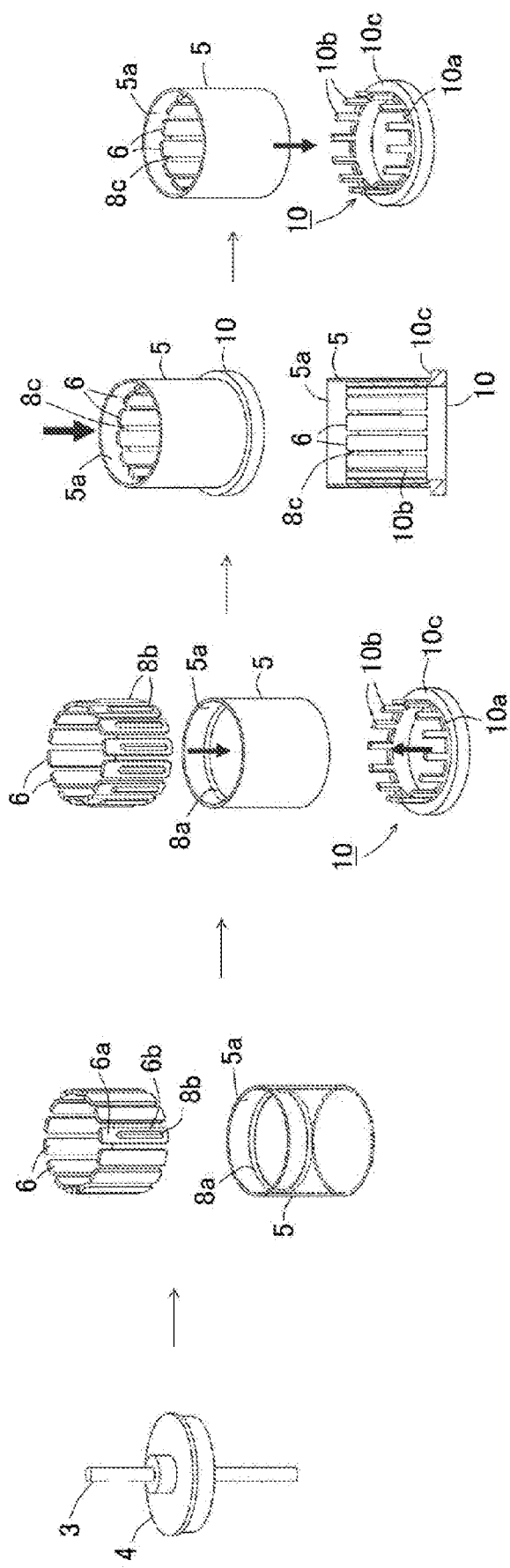

FIG.3A1
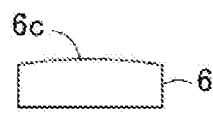
FIG.3B1
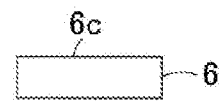
FIG.3A2
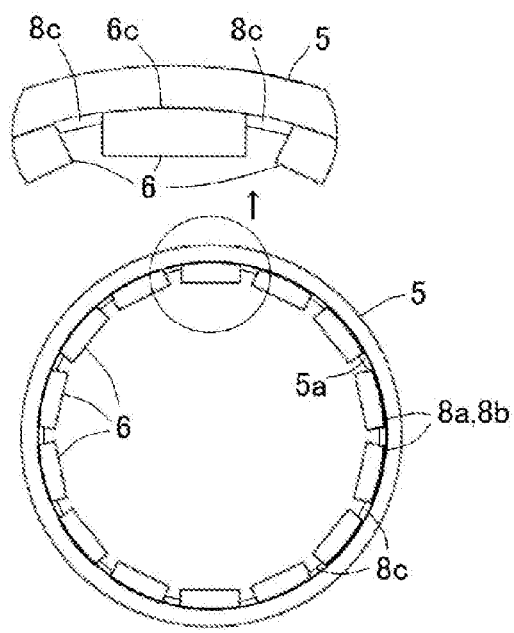
FIG.3B2
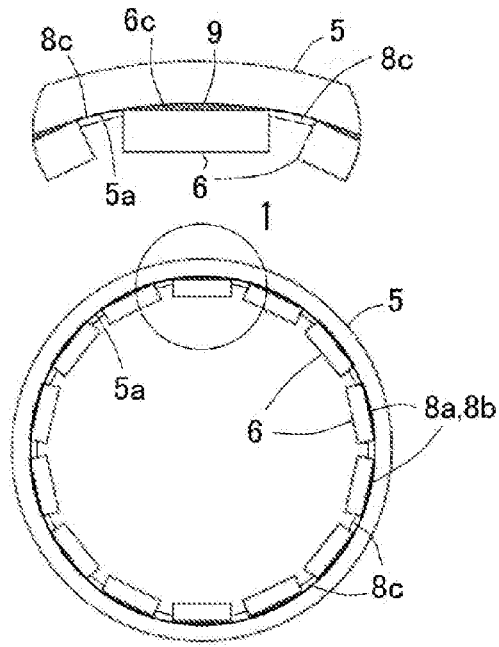
FIG.3A3
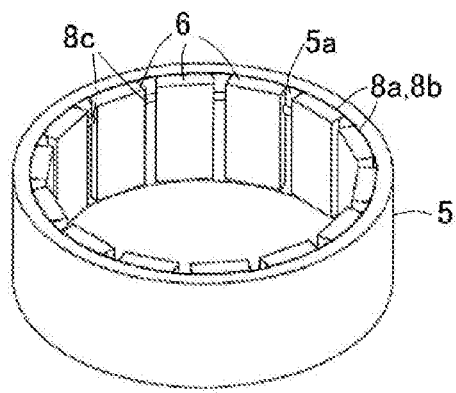
FIG.3B3
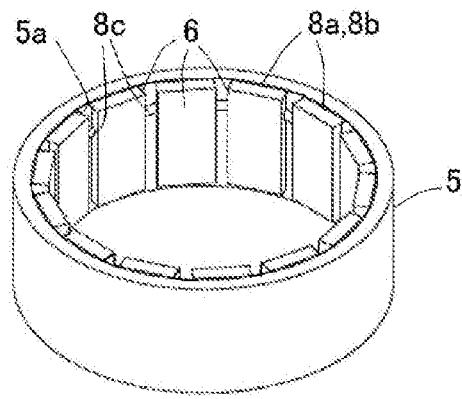

FIG.7A
PRIOR ART
FIG.7B
PRIOR ART
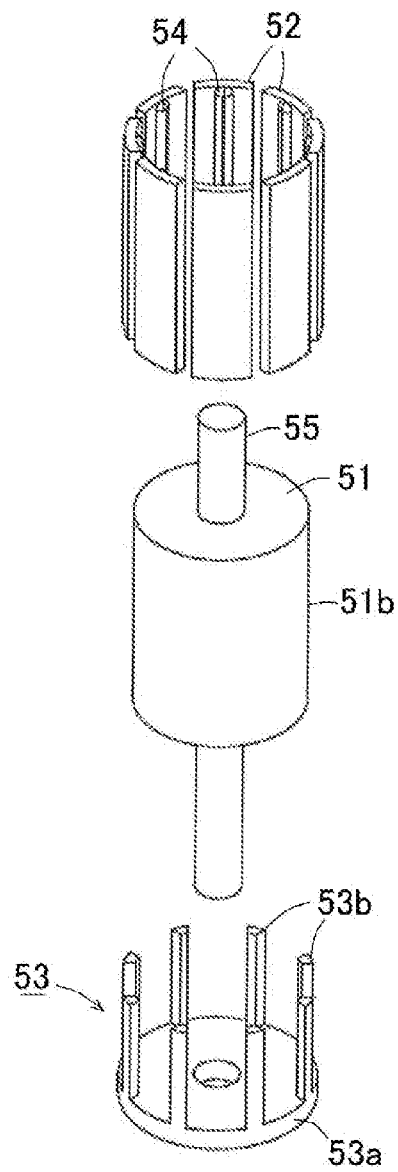
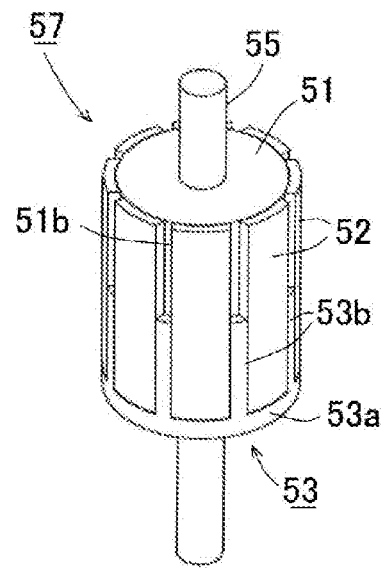

ROTOR, METHOD OF PRODUCING THE ROTOR, AND MOTOR

TECHNICAL FIELD

The present invention relates to a rotor of a motor, a method of producing the rotor, and a motor.

BACKGROUND ART

For example, in a high-output motor, a rare earth magnet containing, for example, neodymium as a main ingredient is used as a rotor magnet. In the case of producing a multipole magnet using a rare earth magnet, a segment magnet divided into segments on a per pole basis is used, instead of an annular magnet for achieving a lighter weight and lower cost. However, it is difficult to align, arrange, and fix the segment magnet at a predetermined position in the circumferential direction of the rotor yoke. The rare earth magnet has a stronger magnetic force than a ferrite magnet but tends to rust easily and therefore is nickel-plated for improving corrosion resistance and has its surface rust-proofed. A bonding surface, when coated with an adhesive and wet, has a lower frictional force and therefore the magnet tends to move easily. Particularly if an epoxy resin-based adhesive is used, the viscosity of the adhesive temporarily drops in the heat-curing process and therefore the magnet tends to be misaligned. If the magnet is misaligned, motor characteristics deteriorate, posing a risk of occurrence of motor vibration and noise.

As such, for example, in a rotor of an outer-rotor motor, each segment magnet 52 is positioned in a radial direction and an axial direction and bonded and fixed to a cylindrical rotor yoke 51, using a positioning member 53 for positioning and holding a plurality of segment magnets 52, as shown in FIG. 6A. In the positioning member 53, pectinate partition members 53b are formed, standing up at a predetermined interval from an annular coupling part 53a. The annular coupling part 53a prescribes the position in the axial direction of the segment magnets 52, and the partition members 53b prescribe the position in the radial direction. After the positioning member 53 is inserted along an inner circumferential surface 51a from an opening at one end side of the rotor yoke 51, the segment magnets 52 coated with an adhesive 54 are inserted and bonded between the partition members 53b from an opening at the other end side of the rotor yoke 51 (see FIG. 6A). Then, the adhesive 54 is heat-cured, bonding and fixing the segment magnets 52 together with the positioning member 53 to the inner circumferential surface 51a of the rotor yoke 51 (see FIG. 6B). After that, a rotor hub 56 assembled with a rotor shaft 55 in a unified manner is pressed into and fixed in the rotor yoke 51 (see FIG. 6C), thus forming an outer-rotor-type rotor 57 rotatable about the rotor shaft 55 (see FIG. 6D).

Similarly, in a rotor of an inner-rotor motor, after a positioning member 53 is attached from one side in the axial direction to an outer circumferential surface 51b of a columnar rotor yoke 51 having a rotor shaft 55 at its center, segment magnets 52 coated with an adhesive 54 are inserted and attached between partition members 53b from the other side in the axial direction (see FIG. 7A). Then, the adhesive 54 is heat-cured, thus forming an inner-rotor-type rotor 57 in which the segment magnets 52 together with the positioning member 53 are bonded and fixed to the outer circumferential surface 51b of the rotor yoke 51 (see FIG. 7B).

Also, a technique of strengthening a fixation retention force of a magnet attached inside a rotor yoke of an outer-rotor motor and thus preventing the magnet from falling during assembly and improving workability has been proposed. A cylindrical inner case is fitted to the inner surface side of a cylindrical rotor outer cylinder, and a resin holder ring with a plurality of magnets arranged via partition pieces is assembled in a unified manner along a circumferential direction between the rotor outer cylinder and the inner case (see PTL 1: JP-A-2003-304660).

CITATION LIST

Patent Literature

PTL 1: JP-A-2003-304660

SUMMARY OF INVENTION

Technical Problem

However, in FIG. 6D and FIG. 7B or PTL 1, the segment magnets 52 together with the positioning member 53 are bonded and fixed to the inner circumferential surface 51a or the outer circumferential surface 51b of the rotor yoke 51 and therefore the positioning member 53, which is originally unnecessary, is bonded together with the segment magnets 52 to the rotor yoke 51 when the adhesive is heat-cured, and the positioning member 53 cannot be removed. Also, the resin holder ring in PTL 1 is used as an essential member for fixing the magnets.

In this way, incorporating the positioning member 53, which is originally unnecessary, and the resin holder ring into the rotor 57 increases the number of components and therefore raises the production cost and also increases the weight of the motor.

Meanwhile, if the segment magnets 52 are bonded and fixed to the rotor yoke 51 without using the positioning member 53, recessed parts 51a and protruding parts 51b for positioning the segment magnets 52 on the inner circumferential surface of the rotor yoke 51 need to be formed alternately in the circumferential direction, as shown in FIG. 8A. Alternatively, pectinate positioning members 56a need to be provided at an outer circumferential edge of the rotor hub 56 pressed into the rotor yoke 51, as shown in FIG. 8B. In either case, the number of processing steps for components increases and therefore the production cost increases.

Solution to Problem

The present invention has been made in order to address the foregoing issue and aims to provide a rotor that achieves a reduction in the number of components, a reduction in the production cost, and a lighter weight, to provide a method of producing a rotor that enables plate-like magnets to be positioned in the radial direction and the axial direction and assembled to a rotor yoke and thus achieves high assemblability, and to provide a motor that is inexpensive, has high assemblability, and can maintain motor characteristics, by using the rotor.

In order to address the foregoing issue, the present invention has at least the following configuration.

In a rotor having a plurality of plate-like magnets divided in a circumferential direction at a predetermined interval at a circumferential surface of a rotor yoke, a first bonding part coated with a first adhesive curing in a predetermined time and a second bonding part coated with a second adhesive taking a longer curing time than the first adhesive but having a higher bonding strength are formed next to each other at a bonding surface of each plate-like magnet, and the plurality of plate-like magnets are positioned in a radial direction and an axial direction and are arranged at a predetermined interval at the circumferential surface of the rotor yoke, and the first adhesive is cured, thus forming each partition part that partitions the plate-like magnets from each other in the circumferential direction and partially bonding the plurality of plate-like magnets at the first bonding part, and the second adhesive is cured, thus bonding and fixing the plurality of plate-like magnets at the second bonding part while the plurality of plate-like magnets are partitioned from each other at a predetermined interval in the circumferential direction by the partition part.

The plurality of plate-like magnets are thus positioned in the radial direction and the axial direction and arranged at a predetermined interval at the circumferential surface of the rotor yoke, using the positioning member, and the first adhesive is cured, thus forming each partition part that partitions the plate-like magnets from each other, and the plate-like magnets can be positioned in the circumferential direction and partially bonded to the rotor yoke at the first bonding part.

The positioning member is removed from the circumferential surface of the rotor yoke and the second adhesive is cured, thus bonding and fixing the plate-like magnets at the second bonding part via the partition part between the plurality of plate-like magnets in the circumferential direction, and this can reduce the positioning member, which is originally unnecessary, reduce the production cost, and achieve a lighter weight of the rotor.

Also, since the plurality of plate-like magnets can be bonded at a predetermined interval to the rotor yoke, using the positioning member, and are positioned and fixed in the circumferential direction via the partition part formed by curing the first adhesive, cost reduction can be achieved, compared with an annular magnet, and the plate-like magnets can be assembled with high position accuracy in the radial direction and the axial direction to the rotor yoke and without misalignment.

It is preferable that the plate-like magnet is a rare earth magnet with a rust-proofed surface and that the first adhesive and the second adhesive are provided in a gap between the rotor yoke and the magnet.

Thus, a high-output plate-like magnet can be bonded and fixed to the rotor yoke without misalignment, using different types of adhesives.

It is preferable that, with respect to the areas of the first bonding part coated with the first adhesive and the second bonding part coated with the second adhesive at the bonding surface of the plate-like magnet, the second bonding part has an area equivalent to or greater than the area of the first bonding part.

Thus, the ultimate bonding strength of the plate-like magnet to the rotor yoke can be maintained.

An ultraviolet-curing adhesive or a combination of an ultraviolet-curing adhesive and an anaerobic-curing adhesive may be used as the first adhesive and a thermosetting adhesive may be used as the second adhesive.

Thus, simply casting ultraviolet rays onto the first adhesive layer provided between the plate-like magnets and between the plate-like magnets and the rotor yoke cures the first adhesive in a relatively short time and forms the partition part (first adhesive curing part) partitioning the plate-like magnets from each other, and therefore enables the plate-like magnet to be easily partially bonded to the rotor yoke. Also, when the second adhesive is heat-cured, the plate-like magnets have been positioned in the circumferential direction by the partition part and partially bonded at the first bonding part and therefore do not become misaligned.

The plate-like magnet may be a flat plate-like magnet, and an adhesive layer may be formed, using a void formed between a curved surface of the rotor yoke and a flat surface of the plate-like magnet as an adhesive reservoir of the first adhesive and the second adhesive.

In this case, since no particular processing is needed for the bonding of the plate-like magnet, the production cost can be reduced and the void formed with the curved surface, which is the bonding surface of the rotor yoke, can be used as the adhesive reservoir of the first adhesive and the second adhesive and therefore as a sufficient bonding space. Thus, the strength of partial bonding and fixed bonding can be maintained. Particularly if ultraviolet rays are cast at the time of partial bonding, a sufficient space for casting ultraviolet rays from the gap between the curved surface and the flat surface can be secured.

The rotor may be a rotor of an outer-rotor motor in which a plurality of plate-like magnets divided in a circumferential direction are fixed at a predetermined interval to an inner circumferential surface of a rotor yoke formed in a cup-like shape, or a rotor of an inner-rotor motor in which a plurality of plate-like magnets divided in a circumferential direction are fixed at a predetermined interval to an outer circumferential surface of a rotor yoke formed in a columnar shape.

Cost reduction and lighter weight are achieved, compared with an annular magnet, and the plate-like magnets can be assembled with high position accuracy in the radial direction and the axial direction to the rotor yoke, regardless of whether it is an outer-rotor type or an inner-rotor type.

As a motor, an outer-rotor motor or an inner-rotor motor that has one of the foregoing rotors and a stator having a stator pole tooth opposite the plate-like magnet of the rotor and is therefore inexpensive and light-weight, has high assemblability and can maintain motor characteristics, can be provided.

A method of producing a rotor includes: a step of coating a circumferential surface of a rotor yoke in a circular manner with a first adhesive curing in a predetermined time; a step of coating a bonding surface of each of plate-like magnets with a second adhesive taking a longer curing time than the first adhesive but having a higher bonding strength; a step of attaching a positioning member having pectinate partition members coupled in an annular form for positioning the plate-like magnets in a radial direction and an axial direction, to the circumferential surface of the rotor yoke; a step of positioning the plate-like magnets between the partition members of the rotor yoke with the positioning member attached, and arranging the plate-like magnets at a predetermined interval at the circumferential surface of the rotor yoke via the first adhesive and the second adhesive; a step of curing the first adhesive, thus forming each partition part that partitions the plate-like magnets from each other in the circumferential direction, and partially bonding the plate-like magnets to the rotor yoke at a first bonding part; a step of extracting the positioning member from the rotor yoke; and a step of curing the second adhesive and thus bonding and fixing the plate-like magnets to the rotor yoke at a second bonding part.

The application of the first adhesive and the second adhesive coating the bonding surface of the plate-like magnets includes both a case where these adhesives are directly applied to the bonding surface and a case where these adhesives are supplied in advance to a surface to be bonded and are then indirectly applied. The plate-like magnet, as a term, is not limited to a flat plate but includes various forms such as a curved plate, provided that it is a plate member with a predetermined thickness.

According to the method of producing the rotor, since the first adhesive is applied to the circumferential surface of the rotor yoke in a circular manner and the second adhesive is applied to each plate-like magnet, adhesives having different curing conditions can be easily handled and can be applied with high work efficiency.

Also, attaching the positioning member having the pectinate partition members coupled in an annular form for positioning in the radial direction and the axial direction, to the rotor yoke, enables the positioning and arrangement of the plate-like magnets in the radial direction and the axial direction between the partition members.

Also, curing the first adhesive can form the partition part (first adhesive curing part) partitioning the plate-like magnets from each other, position the plate-like magnets in the circumferential direction, and partially bond the plate-like magnets to the rotor yoke at the first bonding part. In this state, the positioning member can be extracted from the rotor yoke and this can omit the positioning member, which is originally unnecessary, thus reduce the number of components, reduce the production cost, and achieve a lighter weight of the rotor.

Also, since the plate-like magnets are bonded and fixed to the rotor yoke at the second bonding part by curing the second adhesive coating the plate-like magnets after the positioning member is removed from the rotor yoke, the plate-like magnets can be bonded and fixed with high position accuracy.

The method may be a method of producing a rotor of an outer-rotor motor, including: a step of attaching a positioning member having pectinate partition members coupled to an annular coupling part for positioning the plate-like magnets in the radial direction and the axial direction, to an inner circumferential surface of a cylindrical rotor yoke; a step of inserting each of the plurality of plate-like magnets between the partition members and positioning and arranging the plate-like magnets at a predetermined interval at the inner circumferential surface of the rotor yoke via the first adhesive and the second adhesive; and a step of assembling a rotor hub and a rotor shaft to the rotor yoke in a unified manner.

Alternatively, the method may be a method of producing a rotor of an inner-rotor motor, including: a step of attaching a positioning member having pectinate partition members coupled to an annular coupling part for positioning the plate-like magnets in the radial direction and the axial direction, to an outer circumferential surface of a rotor yoke having a rotor shaft at its center; and a step of inserting each of the plurality of plate-like magnets between the partition members and positioning and arranging the plate-like magnets at a predetermined interval at the outer circumferential surface of the rotor yoke via the first adhesive and the second adhesive.

The plate-like magnets may be partially bonded to the rotor yoke, using an ultraviolet-curing adhesive or a combination of an ultraviolet-curing adhesive and an anaerobic-curing adhesive as the first adhesive.

Thus, simply casting ultraviolet rays onto the first adhesive layer provided between the plate-like magnets and between the plate-like magnets and the rotor yoke cures the first adhesive in a relatively short time and forms the partition part (first adhesive curing part) partitioning the plate-like magnets from each other, and therefore enables the plate-like magnets to be easily partially bonded to the rotor yoke.

The plurality of plate-like magnets may be magnetized before being bonded inside the rotor yoke or may be magnetized after being bonded inside the rotor yoke.

While the plate-like magnets, if magnetized in advance, may attract each other and stick to each other when inserted in the rotor yoke, using the positioning member eliminates the occurrence of such an inconvenience.

Also, if the plate-like magnets are magnetized after being bonded inside the rotor yoke, the work of assembling the plate-like magnets is easier and is less susceptible to the influence of thermal demagnetization.

Advantageous Effects of Invention

As described above, a rotor that achieves a reduction in the number of components, a reduction in the production cost, and a lighter weight, can be provided.

Also, a method of producing a rotor that enables a plurality of plate-like magnets to be positioned in the radial direction and the axial direction and to be bonded and fixed to a rotor yoke with high position accuracy and thus achieves high assemblability, can be provided.

Also, a motor that is inexpensive, has high assemblability, and can maintain motor characteristics by using the rotor, can be provided.

BRIEF DESCRIPTION OF DRAWINGS

FIGS. 1A to 1E are explanatory views showing a process of producing a rotor of an outer-rotor motor.

FIGS. 3A1 to 3B3 are explanatory views showing forms of plate-like magnets bonded and fixed to a rotor yoke.

FIGS. 7A and 7B are process charts showing a method of producing a rotor of an inner-rotor motor according to the related art.

DESCRIPTION OF EMBODIMENTS

An embodiment of a rotor, a method of producing the rotor, and a motor according to the present invention will now be described with reference to the accompanying drawings. First, a schematic configuration of the motor is described with reference to FIGS. 1A to 1E. In this embodiment, a brushless DC motor of an outer-rotor type, or an inner-rotor type, described later, is used as an example of the motor.

Figure 2D:
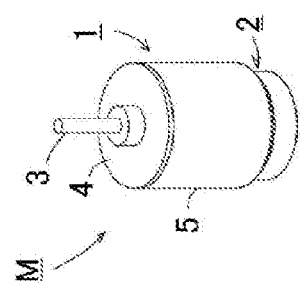
FIGS. 2A to 2D are explanatory views showing the process of producing the outer-rotor motor, continued from FIGS. 1A to 1E.
Figure 2C:
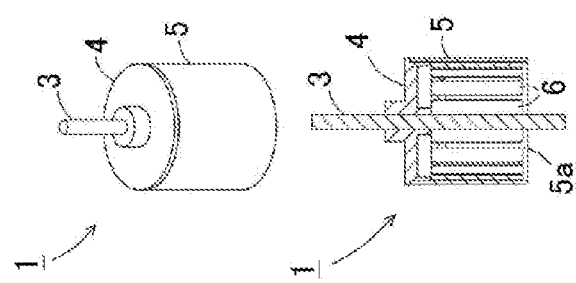

As shown in FIGS. 2C and 2D, an outer-rotor motor M having a rotor 1 and a stator 2 is used as the brushless DC motor. A rotor hub 4 linked to a rotor shaft 3 is fitted in to close an opening at one end of a cylindrical rotor yoke 5 (magnetic material such as iron or stainless steel), thus forming the rotor 1 in a cup-like shape. To an inner circumferential surface 5a of the rotor yoke 5 (see FIG. 2A), a plurality of divided plate-like magnets 6 (rotor magnets) magnetized to alternately have an N pole and an S pole in the circumferential direction are bonded and fixed (see FIG. 2B). Each plate-like magnet 6 is arranged opposite a stator pole tooth 7b of a stator core 7, described later. The plate-like magnet 6, as a term, is not limited to a flat plate shape (see FIG. 3B1) but includes various forms such as a curved plate (see FIG. 3A1), provided that it is a magnetic plate member having a predetermined thickness.

As shown in FIG. 2C, in the stator 2, the stator core 7 is assembled to the outer circumference of a bearing housing 2a. In the stator core 7, a plurality of stator pole teeth 7b are provided, protruding outward in the radial direction from an annular core back part 7a. The stator core 7 may be a laminated core formed by lamination-pressing electromagnetic steel sheets or may be a block core made of a magnetic metal block. In the stator core 7, the peripheries of the stator pole teeth 7b are covered with an insulator (insulation bobbin) 7c, and a coil 7d is wound on the periphery of each insulator 7c. The rotor 1 is rotatably assembled by having the rotor shaft 3 inserted in the bearing housing 2a of the stator 2 and having the plate-like magnets 6 arranged opposite the stator pole teeth 7b of the stator core 7 (see FIG. 2D).

The configuration of the rotor 1 will now be described in detail.

As shown in FIG. 3A3 and FIG. 3B3, the plurality of plate-like magnets 6 divided in the circumferential direction are provided at a predetermined interval and spaced apart from each other at the inner circumferential surface 5a of the cylindrical rotor yoke 5. As the plate-like magnets 6, a rear earth magnet (for example, a neodymium magnet) having a rust-proofed surface is used, and the plate-like magnets 6 are bonded with a first adhesive 8a and a second adhesive 8b provided in the gap between the rotor yoke 5 and the flat plate-shaped plate-like magnets 6. The plurality of plate-like magnets 6 are fixed, partitioned in the circumferential direction by a partition parts (first adhesive curing parts) 8c. Thus, the high-output plate-like magnets 6 can be bonded and fixed to the rotor yoke 5 without misalignment, using a plurality of adhesives having different curing conditions, as will be described later.

Figure 5A:
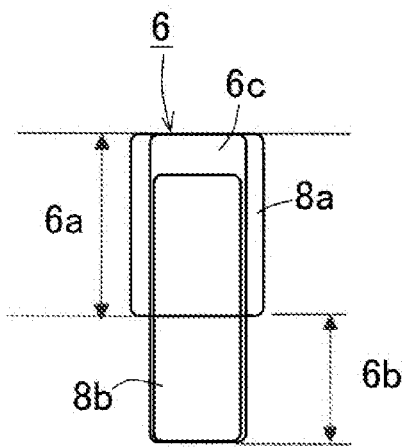
FIGS. 5A and 5B are explanatory views showing a bonding area of a first bonding part and a second bonding part of a plate-like magnet.
Figure 5B:
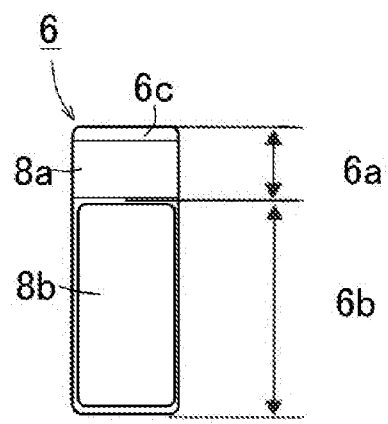
Figure 6A:
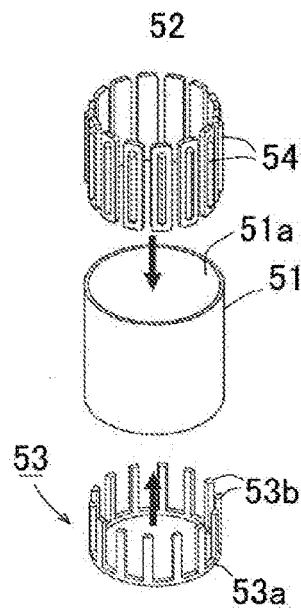
FIGS. 6A to 6D are process charts showing a method of producing a rotor of an outer-rotor motor according to the related art.
Figure 6B:
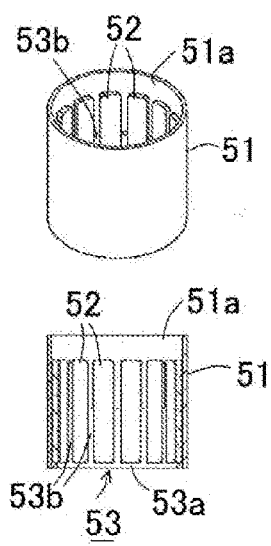
Figure 6C:
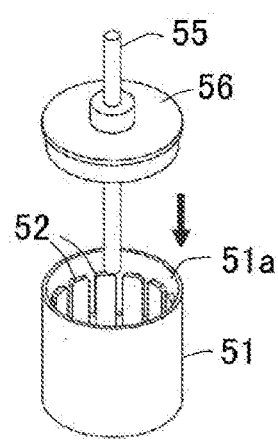
Figure 6D:
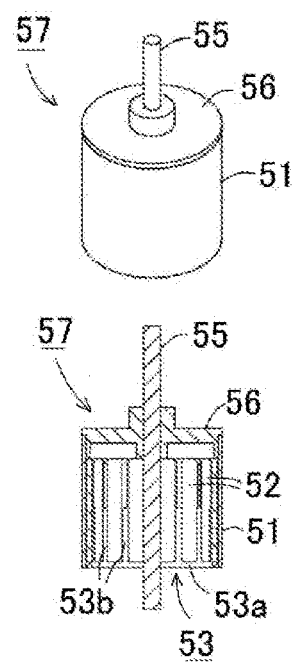
Figure 8A:
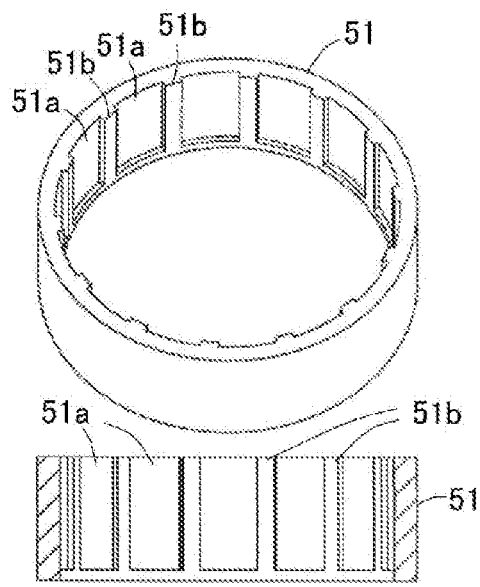
FIGS. 8A and 8B are explanatory views showing a required configuration of a rotor yoke and a rotor hub.
Figure 8B:
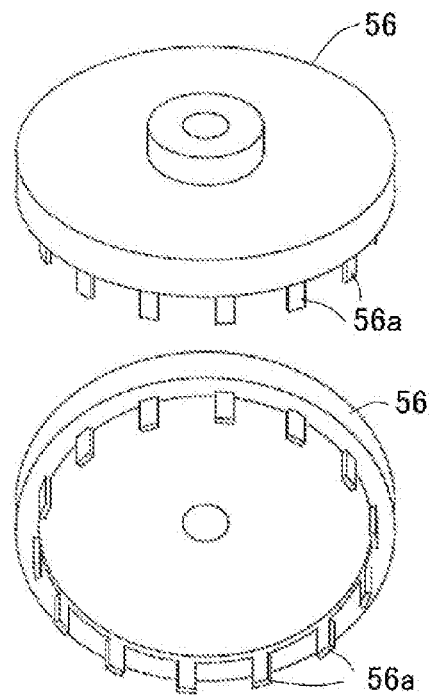

At a bonding surface 6c of each plate-like magnet 6, a first bonding part 6a coated with the first adhesive 8a curing in a predetermined time and a second bonding part 6b coated with the second adhesive 8b for bonding and fixation that takes a longer curing time than the first adhesive 8a but has a higher bonding strength, are formed next to each other, as shown in FIGS. 5A and 5B. As the first adhesive 8a, for example, an ultraviolet-curing adhesive or a mixture of an ultraviolet-curing adhesive and an anaerobic-curing adhesive is used, and as the second adhesive 8b, for example, a thermosetting epoxy resin-based adhesive is used. Thus, simply casting ultraviolet rays onto the first adhesive 8a provided between the plate-like magnets 6 and the rotor yoke 5 cures the first adhesive 8a in a relatively short time and forms the partition parts (first adhesive curing parts) 8c partitioning the plate-like magnets 6 from each other, and therefore enables the plate-like magnet 6 to be easily partially bonded to the rotor yoke 5. Also, when the second adhesive 8b is heat-cured, the plate-like magnets 6 have been positioned in the circumferential direction by the partition parts 8c and partially bonded with the first adhesive 8a and therefore do not become misaligned. FIG. 3B3 shows the state where the plate-like magnets 6 are bonded to the inner circumferential surface 5a of the rotor yoke 5.

The plate-like magnet 6 is flat plate-shaped and an adhesive reservoir of the first adhesive 8a and the second adhesive 8b is formed in a void 9 formed between the curved inner circumferential surface 5a of the rotor yoke 5 and the bonding surface 6c of the flat plate-shaped plate-like magnet 6, as shown in FIG. 3B2. In this case, since no particular processing is needed for the plate-like magnet 6, the production cost can be reduced and the void 9 formed with the inner circumferential surface 5a (curved surface), which is the bonding surface of the rotor yoke 5, can be used as the adhesive reservoir of the first adhesive 8a and the second adhesive 8b and therefore the strength of partial bonding and fixed bonding can be maintained. Particularly if ultraviolet rays are cast at the time of partial bonding, a sufficient space for casting ultraviolet rays from the gap between the inner circumferential surface 5a (curved surface) and the end surface of the flat plate-shaped plate-like magnet 6 can be secured.

As shown in FIGS. 5A and 5B, it is preferable that, with respect to the bonding area formed at the bonding surface 6c of the plate-like magnet 6, the second bonding part 6b has an area equivalent to the area of the first bonding part 6a (see FIG. 5A) or greater (the second bonding part 6b>the first bonding part 6a) (see FIG. 5B). Thus, the bonding strength of the plate-like magnet 6 to the rotor yoke 5 can be maintained.

As described above, an ultraviolet-curing adhesive or a mixture of an ultraviolet-curing adhesive and an anaerobic-curing adhesive is used as the first adhesive 8a and a thermosetting epoxy resin-based adhesive is used as the second adhesive 8b. Thus, casting ultraviolet rays onto the first adhesive 8a provided between the plate-like magnets 6 and between the plate-like magnets 6 and the rotor yoke 5 cures the first adhesive 8a in a relatively short time and forms the partition parts 8c partitioning the plate-like magnets 6 from each other, and therefore enables the plate-like magnets 6 to be easily partially bonded to the rotor yoke 5. Also, when the second adhesive 8b is heat-cured, the plate-like magnets 6 have been positioned in the circumferential direction by the partition parts 8c and partially bonded with the first adhesive 8a and therefore the plate-like magnets 6 do not become misaligned.

While the case where the plate-like magnet 6 is a flat plate-shaped has been described, the plate-like magnet 6 may be in the shape of a curved plate with the bonding surface 6c having the same curvature as the rotor yoke 5, as shown in FIG. 3A1. In this case, the adhesives 8a, 8b applied between the curved inner circumferential surface 5a of the rotor yoke 5 and the bonding surface 6c of the plate-like magnet 6 is formed uniformly in the circumferential direction of the bonding surface 6c, as shown in FIG. 3A2. This case is similar to the case of the flat plate-like magnet in that the inner circumferential surface 5a of the rotor yoke 5 is coated in a circular manner with the first adhesive 8a for partial bonding and that the plate-like magnets 6 are coated with the second adhesive 8b for bonding and fixation, as shown in FIG. 1B. FIG. 3A3 shows the state where the plate-like magnets 6 are bonded to the inner circumferential surface 5a of the rotor yoke 5.

Also, as shown in FIG. 1C, a positioning member 10 made of a resin for positioning, bonding, and fixing the plurality of plate-like magnets 6 to the inner circumferential surface 5a of the rotor yoke 5 is used. A resin-molded member is used as the positioning member 10, and the positioning member 10 has an annular coupling part 10a coupled in an annular shape and a plurality of partition members 10b that are formed, standing up in a pectinate shape from the annular coupling part 10a. The interval between the partition members 10b is approximately equivalent to or broader than the width dimension of the plate-like magnet 6. Also, at the annular coupling part 10a, a flange part 10c for positioning by coming into contact with an opening end of the rotor yoke 5 is provided, extending outward in the radial direction.

As shown in FIG. 1D, the positioning member 10 (partition members 10b) is inserted to the inner circumferential surface 5a from an opening at one end of the rotor yoke 5, and the plate-like magnets 6 are inserted between the partition members 10b from an opening at the other end and thus positioned in the radial direction and the axial direction to the inner circumferential surface 5a.

At this point, since the inner circumferential surface 5a of the rotor yoke 5 is coated with the first adhesive 8a in a circular manner, the plate-like magnets 6 can be positioned in the radial direction and the axial direction and thus arranged at the rotor yoke 5. As ultraviolet rays are cast, the first adhesive 8a cures in a relatively short time and the partition parts 8c partitioning the plate-like magnets 6 from each other are formed. Therefore, the plate-like magnet 6 can be easily partially bonded to the rotor yoke 5.

Also, in the state where the plate-like magnets 6 have been partially bonded to the inner circumferential surface 5a of the rotor yoke 5, the positioning member 10, which is no longer necessary, can be extracted and removed from the rotor yoke 5, as shown in FIG. 1E. After the positioning member 10 is removed from the rotor yoke 5, the epoxy resin-based second adhesive 8b is heat-cured, for example, at 100° C. to 180° C., thus bonding and fixing the plate-like magnets 6 at the second bonding part 6b. Although the viscosity of the second adhesive 8b temporarily drops in the heat curing process, the plate-like magnets 6 have been positioned in the circumferential direction by the partition parts 8c and partially bonded with the first adhesive 8a and therefore do not become misaligned. This can reduce the positioning member 10, which is originally unnecessary, reduce the production cost, and achieve a lighter weight of the rotor 1.

Also, since the plurality of plate-like magnets 6 are bonded and fixed at a predetermined interval to the rotor yoke 5, using the positioning member 10, cost reduction can be achieved, compared with an annular magnet, and the plate-like magnets 6 can be assembled to the rotor yoke 5 with high position accuracy in the radial direction and the axial direction and without misalignment.

In this way, the rotor 1 of the outer-rotor motor, in which the plurality of plate-like magnets 6 divided in the circumferential direction are fixed at a predetermined interval to the inner circumferential surface 5a of the rotor yoke 5, may be formed.

Figure 4A:
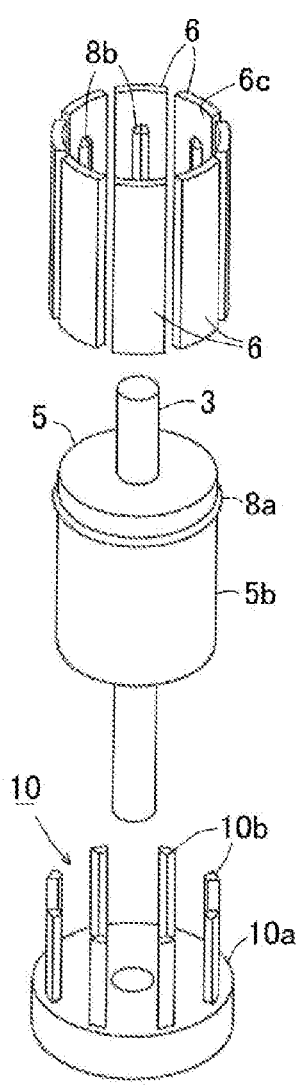
FIGS. 4A to 4C are explanatory views showing a process of producing a rotor of an inner-rotor motor.

Meanwhile, as shown in FIG. 4A, the positioning member 10 may be used for positioning, bonding, and fixing the plurality of plate-like magnets 6 (curved plates) to an outer circumferential surface 5b of the rotor yoke 5 of an inner-rotor motor. The positioning member 10 is made of a resin-molded member and has the annular coupling part 10a coupled in an annular shape and the plurality of partition members 10b that are formed, standing up in a pectinate shape from the annular coupling part 10a. The flange part 10c may be not provided.

As shown in FIG. 4A, the partition members 10b of the positioning member 10 are fitted with the outer circumferential surface 5b from one end side in the axial direction of the rotor yoke 5 and the annular coupling part 10a is brought into contact with and attached to one end surface of the rotor yoke 5. The plurality of plate-like magnets 6 are each inserted between the partition members 10b from the other end surface side of the rotor yoke 5 and thus positioned in the radial direction and the axial direction.

Figure 4B:
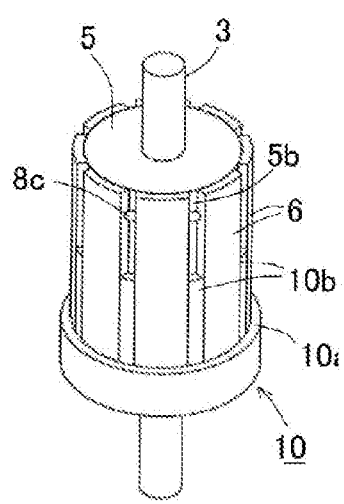
Figure 4C:
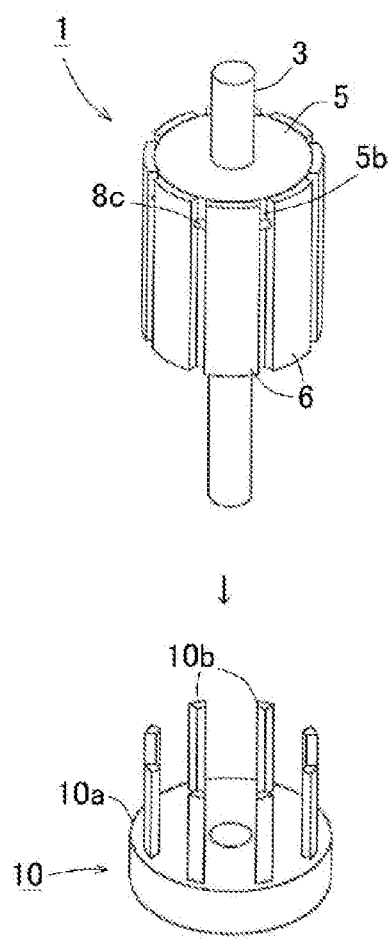

At this point, since the outer circumferential surface 5b of the rotor yoke 5 is coated with the first adhesive 8a in a circular manner, as shown in FIG. 4B, the plate-like magnets 6 can be positioned and arranged at the rotor yoke 5. As ultraviolet rays are cast, the first adhesive 8a cures in a relatively short time and the partition parts (first adhesive curing parts) 8c partitioning the plate-like magnets 6 from each other are formed. Therefore, the plate-like magnet 6 can be easily partially bonded to the rotor yoke 5. In the state where the plate-like magnets 6 have been partially bonded, the positioning member 10, which is no longer necessary, can be extracted and removed from the rotor yoke 5, as shown in FIG. 4C. After the positioning member 10 is removed from the rotor yoke 5, the second adhesive 8b is heat-cured, for example, at 100° C. to 180° C., thus bonding and fixing the plate-like magnets 6 at the second bonding part 6b. Although the viscosity of the second adhesive 8b temporarily drops in the heat curing process, the plate-like magnets 6 have been positioned in the circumferential direction by the partition parts 8c and partially bonded with the first adhesive 8a and therefore the plate-like members 6 do not become misaligned.

In this way, the rotor 1 of the inner-rotor motor, in which the plurality of plate-like magnets 6 divided in the circumferential direction are fixed at a predetermined interval to the outer circumferential surface 5b of the rotor yoke 5 formed in a columnar shape, is provided, as shown in FIG. 4C.

The foregoing configurations of the rotor 1 achieve cost reduction and lighter weight, compared with an annular magnet, and enables the plate-like magnets 6 to be assembled with high position accuracy in the radial direction and the axial direction to the rotor yoke 5 regardless of whether it is an outer-rotor type or an inner-rotor type.

Also, the motor M has one of the foregoing rotors 1, and the stator 2 having the stator pole teeth 7b opposite the plate-like magnets 6 of the rotor 1, and thus can provide an outer-rotor motor or an inner-rotor motor that is inexpensive and light weight, has high assemblability, and can maintain motor characteristics.

The process of producing the rotor 1 of the outer-rotor motor will now be described with reference to FIGS. 1A to 1E and FIGS. 2A to 2D. In FIG. 1A, the rotor shaft 3 is fitted in a center part of the rotor hub 4 and assembled in a unified manner. As shown in FIG. 1B, the inner circumferential surface 5a of the rotor yoke 5 corresponding to the first bonding part 6a (see FIGS. 5A and 5B) of the plate-like magnets 6 is coated in a circular manner with the first adhesive 8a curing in a predetermined time. As the first adhesive 8a, for example, an ultraviolet-curing adhesive or a mixture of an ultraviolet-curing adhesive and an anaerobic-curing adhesive is used. Also, the second bonding part 6b next to the first bonding part 6a of the plate-like magnets 6 is each coated with the second adhesive 8b taking a longer curing time than the first adhesive 8a but having a higher bonding strength. As the second adhesive 8b, for example, a thermosetting epoxy resin-based adhesive is used.

In the process of applying the first and second adhesives 8a, 8b, the inner circumferential surface 5a corresponding to the first bonding part 6a is coated with the first adhesive 8a in a circular manner from the side of the opening at the one end of the rotor yoke 5, and the second bonding part 6b of the plate-like magnets 6 is coated with the second adhesive 8b in the shape of a line in the longitudinal direction, as shown in FIG. 1B. Thus, adhesives having different curing conditions can be easily handled and can be applied with high work efficiency.

Next, as shown in FIG. 1C, the positioning member 10 having the pectinate partition members 10b coupled to the annular coupling part 10a for positioning the plate-like magnets 6 in the radial direction and the axial direction is attached to the inner circumferential surface 5a of the rotor yoke 5. The partition members 10b are inserted from the side of the opening at the other end of the rotor yoke 5 and inserted until the flange part 10c comes into contact with the opening end.

Next, as shown in FIG. 1D, the plate-like magnets 6 are each inserted between the partition members 10b of the rotor yoke 5 with the positioning member 10 attached, from the side of the opening at the one end, and are arranged at a predetermined interval at the inner circumferential surface 5a of the rotor yoke 5 via the first adhesive 8a and the second adhesive 8b.

In the state shown in FIG. 1D, the first adhesive 8a coating the plate-like magnets 6 is cured, thus partially bonding the plate-like magnets 6 at the first bonding part 6a to the rotor yoke 5. Specifically, as ultraviolet rays are cast onto the first adhesive 8a, the first adhesive 8a cures and the partition parts 8c partitioning the plate-like magnets 6 from each other are formed, and therefore the plate-like magnets 6 can be positioned in the circumferential direction and partially bonded to the rotor yoke.

If the first adhesive 8a is a mixture of an ultraviolet-curing adhesive and an anaerobic-curing adhesive, the adhesive at the end surface of the plate-like magnets 6 is cured by ultraviolet irradiation and thus becomes shut off from the outside air, and therefore the adhesive inside (inside the void 9, see FIG. 3B2) is put in an anaerobic state and cured.

Next, as shown in FIG. 1E, the unnecessary positioning member 10 is extracted from the rotor yoke 5 with the plate-like magnets 6 partially bonded, via the opening at the other end.

Figure 2B:
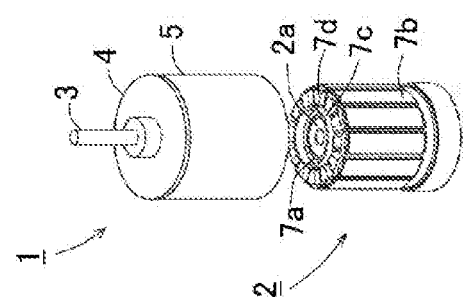
Figure 2A:
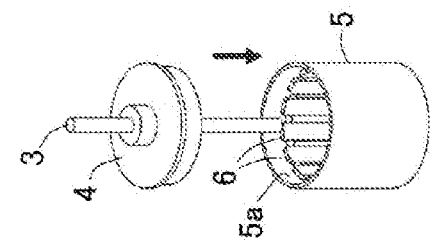

Next, as shown in FIG. 2A, the rotor hub 4 and the rotor shaft 3 assembled together as shown in FIG. 1A are fitted in the opening at the one end of the rotor yoke 5 and assembled in a unified manner, thus assembling the rotor 1. FIG. 2B shows the assembled state of the rotor 1.

Next, the epoxy resin-based second adhesive 8b is heat-cured at a predetermined temperature within a range of 100° C. to 180° C., thus bonding and fixing the plate-like magnets 6 at the second bonding part 6b to the inner circumferential surface of the rotor yoke 5.

The plurality of plate-like magnets 6 may be magnetized before being bonded inside the rotor yoke 5 or may be magnetized after being bonded inside the rotor yoke 5.

While the plate-like magnets 6, if magnetized in advance, may attract each other and stick to each other when inserted in the rotor yoke 5, using the positioning member 10 eliminates the occurrence of such an inconvenience. Also, if the plate-like magnets 6 are magnetized after being bonded to the inner circumferential surface 5a of the rotor yoke 5, the work of assembling the plate-like magnets 6 is easier and is less susceptible to the influence of thermal demagnetization.

In this way, the rotor 1 is produced and assembled to the stator 2 and the motor M is thus produced. Specifically, as shown in FIG. 2C, the rotor 1 has the rotor shaft 3 inserted in the bearing housing 2a of the stator 2 and is rotatably supported by a bearing, not illustrated. The plate-like magnets 6 of the rotor yoke 5 are arranged opposite the stator pole teeth 7b of the stator core 7 and are rotatably assembled. FIG. 2D shows the motor M having the rotor 1 assembled to the stator 2.

In the case of the rotor 1 of the inner-rotor motor, the rotor 1 can be produced by a similar process that differs only in the surface at which the first adhesive 8a is applied to the rotor yoke 5, as shown in FIG. 4A. That is, as shown in FIG. 4A, the outer circumferential surface 5b corresponding to the first bonding part 6a of the rotor yoke 5 is coated with the first adhesive 8a in a circular manner and the bonding surface 6c corresponding to the second bonding part 6b of the plate-like magnets 6 is coated with the second adhesive 8b.

The positioning member 10 having the pectinate partition members 10b coupled to the annular coupling part 10a for positioning the plate-like magnets 6 in the radial direction and the axial direction is attached to the outer circumferential surface 5b of the rotor yoke 5 assembled in a columnar shape having the rotor shaft 3 at its center, as shown in FIG. 4A. The partition members 10b are fitted along the outer circumferential surface 5b of the rotor yoke 5 and are fitted until the annular coupling part 10a comes into contact with the end surface of the rotor yoke 5.

Next, as shown in FIG. 4B, the plate-like magnets 6 are each inserted between the partition members 10b of the rotor yoke 5 with the positioning member 10 attached, and are positioned and arranged at a predetermined interval at the outer circumferential surface 5b of the rotor yoke 5 via the first adhesive 8a and the second adhesive 8b.

In the state shown in FIG. 4B, ultraviolet rays are cast onto the first adhesive 8a, thus curing the first adhesive 8a and forming each of the partition parts 8c partitioning the plate-like magnets 6 from each other, and the plate-like magnets 6 are thus partially bonded at the first bonding part 6a to the outer circumferential surface 5b of the rotor yoke 5. As the first adhesive 8a coating the plate-like magnets 6 is cured, the plate-like magnets 6 are partially bonded at the first bonding part 6a to the rotor yoke 5.

Next, as shown in FIG. 4C, the positioning member 10, which is no longer necessary, is extracted from the rotor yoke 5 with the plate-like magnets 6 partially bonded, thus assembling the rotor 1.

Finally, the epoxy resin-based second adhesive 8b is heat-cured at a predetermined temperature within a range of 100° C. to 180° C., thus bonding and fixing the plate-like magnets 6 at the second bonding part 6b to the outer circumferential surface 5b of the rotor yoke 5. In this way, the rotor 1 of the inner-rotor motor is produced.

The plurality of plate-like magnets 6 may be magnetized before being bonded to the rotor yoke 5 or may be magnetized after being bonded inside the rotor yoke 5.

According to the foregoing method of producing the rotor 1, since the first adhesive 8a is applied to the circumferential surface of the rotor yoke 5 in a circular manner and the second adhesive 8b is applied to each plate-like magnet 6, adhesives having different curing conditions can be easily handled and can be applied with high work efficiency.

Also, attaching the positioning member 10 having the pectinate partition members 10b coupled in an annular shape for positioning in the radial direction and the axial direction, to the rotor yoke 5, enables the positioning and arrangement of the plate-like magnets 6 in the radial direction and the axial direction between the partition members 10b.

Also, as the first adhesive 8a is cured, the partition parts 8c partitioning the plate-like magnets 6 from each other are formed and therefore the plate-like magnets 6 can be positioned in the circumferential direction and partially bonded to the rotor yoke 5. In this state, the positioning member 10 can be extracted from the rotor yoke 5, and therefore a reduction in the number of components, a reduction in the production cost, and a lighter weight of the rotor 1 can be achieved by omitting the positioning member 10, which is originally unnecessary.

Also, since the plate-like magnets 6 are bonded and fixed to the rotor yoke 5 by curing the second adhesive 8b coating the plate-like magnets 6 after the positioning member 10 is removed from the rotor yoke 5, the plate-like magnets 6 can be bonded and fixed with high position accuracy.

As described above, the rotor 1 that achieves a reduction in the number of components, a reduction in the production cost, and a lighter weight, can be provided. Also, a method of producing a rotor that enables the plurality of plate-like magnets 6 to be positioned in the radial direction and the axial direction and bonded and fixed to the rotor yoke 5 with high position accuracy and thus achieves high assemblability, can be provided.

Also, the motor M that is inexpensive, has high assemblability, and can maintain motor characteristics, by using the rotor 1, can be provided.

What is claimed is:

1. A rotor comprising a plurality of flat plate-like magnets divided in a circumferential direction at a predetermined interval at a circumferential surface of a cylindrical rotor yoke, each of the flat plate-like magnets being a rare earth magnet with a rust-proofed surface, wherein
a first bonding part coated with a first adhesive curing in a predetermined time in a circular manner at the circumferential surface of the rotor yoke and being an ultraviolet-curing adhesive or a combination of an ultraviolet-curing adhesive and an anaerobic-curing adhesive and a second bonding part coated with a thermosetting second adhesive taking a longer curing time than the first adhesive but having a higher bonding strength are formed next to each other or partially overlapping each other at a bonding surface of each flat plate-like magnet, using a plurality of adhesives having different curing conditions, and an adhesive layer is formed, using a void formed between a curved surface of the rotor yoke and a flat surface of the flat plate-like magnet as an adhesive reservoir of the first adhesive and the second adhesive, and
each partition part that partitions the flat plate-like magnets from each other in the circumferential direction is formed by the curing of the first adhesive including the adhesive reservoir, and the plurality of flat plate-like magnets arranged at the circumferential surface of the rotor yoke are partially bonded to the first bonding part and positioned in a radial direction and in an axial direction, and the plurality of flat plate-like magnets are bonded and fixed to each other at all of the first bonding part and the second bonding part by the thermosetting of the second adhesive including the adhesive reservoir while the plurality of flat plate-like magnets are partitioned from each other at a predetermined interval in the circumferential direction by the partition part.

2. The rotor according to claim 1, wherein with respect to an area of the first bonding part coated with the first adhesive and the second bonding part coated with the second adhesive at the bonding surface of the flat plate-like magnet, the second bonding part has an area equivalent to or greater than the area of the first bonding part.

3. The rotor according to claim 1, wherein the rotor is a rotor of an outer-rotor motor in which the plurality of flat plate-like magnets divided in a circumferential direction are fixed at a predetermined interval to an inner circumferential surface of the rotor yoke formed in a cup-like shape.

4. The rotor according to claim 1, wherein the rotor is a rotor of an inner-rotor motor in which the plurality of flat plate-like magnets divided in a circumferential direction are fixed at a predetermined interval to an outer circumferential surface of the rotor yoke formed in a columnar shape.

5. A motor comprising the rotor according to claim 1 and a stator having a stator pole tooth opposite the flat plate-like magnet of the rotor.

6. A method of producing a rotor, comprising:
a step of coating a circumferential surface of a cylindrical rotor yoke in a circular manner with a first adhesive curing in a predetermined time and being an ultraviolet-curing adhesive or a combination of an ultraviolet-curing adhesive and an anaerobic-curing adhesive;
a step of coating a bonding surface of each of a plurality of divided flat plate-like magnets with a thermosetting second adhesive taking a longer curing time than the first adhesive but having a higher bonding strength, each of the flat plate-like magnets being a rare earth magnet with a rust-proofed surface;
a step of attaching a positioning member having pectinate partition members coupled in an annular form for positioning the flat plate-like magnets in a radial direction and an axial direction, to the circumferential surface of the rotor yoke;
a step of positioning the flat plate-like magnets between the partition members of the rotor yoke with the positioning member attached, and arranging the flat plate-like magnets at a predetermined interval at the circumferential surface of the rotor yoke via the first adhesive and the second adhesive, using a void formed between a curved surface of the rotor yoke and a flat surface of the flat plate-like magnet as an adhesive reservoir;
a step of curing the first adhesive, thus forming each partition part that partitions the flat plate-like magnets from each other in the circumferential direction, and partially bonding the flat plate-like magnets to the rotor yoke at a first bonding part and thus positioning the flat plate-like magnets in the radial direction and the axial direction;
a step of extracting the positioning member from the rotor yoke; and
a step of thermosetting the second adhesive to bond to a second bonding part formed next to or partially overlapping with the first bonding part, and thus bonding and fixing the flat plate-like magnets to the rotor yoke at all of the first bonding part and the second bonding part.

7. The method of producing the rotor of an outer-rotor motor according to claim 6, comprising:
a step of attaching a positioning member having pectinate partition members coupled to an annular coupling part for positioning the flat plate-like magnets in the radial direction and the axial direction, to an inner circumferential surface of a cylindrical rotor yoke;
a step of inserting each of the plurality of flat plate-like magnets between the partition members and positioning and arranging the flat plate-like magnets at a predetermined interval at the inner circumferential surface of the rotor yoke via the first adhesive and the second adhesive; and
a step of assembling a rotor hub and a rotor shaft to the rotor yoke in a unified manner.

8. The method of producing the rotor of an inner-rotor motor according to claim 6, comprising:
- a step of attaching a positioning member having pectinate partition members coupled to an annular coupling part for positioning the flat plate-like magnets in the radial direction and the axial direction, to an outer circumferential surface of a rotor yoke having a rotor shaft at its center; and
- a step of inserting each of the plurality of flat plate-like magnets between the partition members and positioning and arranging the flat plate-like magnets at a predetermined interval at the outer circumferential surface of the rotor yoke via the first adhesive and the second adhesive.

9. The method of producing the rotor according to claim 6, wherein the plurality of flat plate-like magnets are magnetized before being bonded inside the rotor yoke or are magnetized after being bonded inside the rotor yoke.

\* \* \* \* \*